US007085014B2

(12) United States Patent
Condon et al.

(10) Patent No.: US 7,085,014 B2
(45) Date of Patent: Aug. 1, 2006

(54) METHOD, APPARATUS AND ARTICLE OF MANUFACTURE USING MEDIA ROUGHNESS AS A PRINT PARAMETER

(75) Inventors: John B. Condon, Berthoud, CO (US); Joan LaVerne Mitchell, Longmont, CO (US); David Joseph Shields, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 09/876,507

(22) Filed: Jun. 6, 2001

(65) Prior Publication Data

US 2002/0186415 A1 Dec. 12, 2002

(51) Int. Cl.
*H04N 1/405* (2006.01)

(52) U.S. Cl. .................... 358/3.06; 358/3.13; 358/3.14

(58) Field of Classification Search .............. 358/3.06, 358/3.13, 3.14, 3.21, 3.24, 534, 535, 536
See application file for complete search history.

(56) References Cited

U.S. PATENT DOCUMENTS 4,869,101 A 9/1989 Dvorsky
4,876,606 A * 10/1989 Banno et al. ............... 358/434
5,072,238 A * 12/1991 Takamiya et al. ........... 347/198
5,684,707 A 11/1997 Rogowski
5,774,146 A * 6/1998 Mizutani ..................... 347/43
5,974,160 A 10/1999 Shiratori et al.
6,067,406 A 5/2000 Van Hoof et al.
6,606,945 B1 * 8/2003 Shimatsu et al. ........... 101/225
6,654,143 B1 * 11/2003 Dalal et al. .................. 358/1.9
2002/0085233 A1 * 7/2002 Degani et al. ............. 358/3.06

FOREIGN PATENT DOCUMENTS

SU 239634 3/1964
SU 896407 8/1979
SU 918852 9/1979
SU 1024708 A 4/1981

OTHER PUBLICATIONS

Cojoc et al., “Surface Roughness Characterization of Printing Paper, By Fourier Spectrum Analysis”, Photonics 95, European Optical Society Annual Meetings Digest Series, vol. 2A, Aug. 23-25, 1995, pp. 97-100.

Huynh et al.,“A New Optical Method of Paper Roughness Measurement for Hard-Copy Devices”, Society for Information Display International Symposium Digest of Technical Papers, vol. XVIII, May 12-14, 1987, pp. 271, 279-282.

* cited by examiner

*Primary Examiner*—Thomas D. Lee
(74) *Attorney, Agent, or Firm*—Chambliss, Bahner & Stophel, P.C.; David W. Lynch

(57) ABSTRACT

A method, apparatus and article of manufacture for providing improved print quality regardless of media smoothness is disclosed. Information regarding the smoothness of media is ascertained and the information about the media smoothness is used in the generation of an output. A selectable halftone screen is used in the print device to provide different halftone screens for different media smoothness. The halftoning screens can be changed depending on the roughness of the media being used. Pre-defined halftone screens may be stored and selected for a range of media smoothness. The selection of the pre-defined halftones may be selected by the operator or may be selected automatically by the print device.

24 Claims, 3 Drawing Sheets

METHOD, APPARATUS AND ARTICLE OF MANUFACTURE USING MEDIA ROUGHNESS AS A PRINT PARAMETER

BACKGROUND OF THE INVENTION

1. Field of the Invention

This invention relates in general to print output apparatus and methods, and more particularly to a method, apparatus and article of manufacture using media roughness as a print parameter.

2. Description of Related Art

In electronic print devices for printing, coping and desktop publishing systems, images are usually offered in electronic form, and are then referred to as electronic images. These electronic images can be stored permanently on magnetic disk or transported via direct links or networks to the print devices. The creation of a page results in an electronic data stream or electronic file describing the several elements of the page layout in electronic format. This electronic page layout is usually expressed in a page description language. The electronic page layout comprises the data for each electronic image that must appear on the printed reproduction.

In order to render images such as pictures, letters, and characters from input information, halftone screens are used to cause the illusion of continuous-tone pictures when the display or print device is capable of producing only binary picture elements. For example, input images are divided into a number of very small cells (called picture elements herein below) arranged in matrix form and each of the printed images is obtained as a whole by using picture element reproduction elements, one each of which being disposed so as to correspond to a different picture element. In general, according to this method, in most cases, logic circuits such as digital integrated circuits are used in electric circuits driving picture element reproduction elements.

In such a printing device, each electronic gray level, which may be an eight bit number, for example, having a value N between 0 and 255, is converted to a visual density on the hard copy. This density, D, is defined as the negative base ten logarithm of the portion of reflected or transmitted light from incident light on the hard copy. The relation between the gray level N and the density D is strongly dependent on the output device. In order to get the same reproduction from the same electronic page layout on different output devices, the gray level N is not fed directly to the printing device, but rather a stimulus value S is applied to the printing device. The stimulus value S is derived from the gray level N in such a manner that after transformation of the stimulus S to a density D by the printing device, a specific relation exists between the gray level N and the resulting density D. This is called linearization of the printing device, and is thus achieved by establishing a device specific relation between the gray level N and the device stimulus S. This relation is referred to as a tone curve or a transfer function.

It is known in the art that most printing devices have a device specific transfer function incorporated, which is obtained by calibration. Each time when electronic images are printed on this device, the same device specific transfer function is applied to the gray levels of the electronic image.

Problems arise when the output mode of the output device changes without a corresponding change in print parameters. One output device can for example render electronic images on an output medium. The term medium or media indicates the physical material on which the output appears. As applied to paper, "print quality" is an assessment of a particular paper surface respective to the printed product on that surface. One of the more influential objective factors bearing upon the print quality of a paper surface is the "roughness" of that surface. Hereinafter, the terms "roughness" and "smoothness" may be used to refer to the texture of the media surface. Those skilled in the art will recognize that the term "roughness" is merely the opposite perspective from "smoothness", and that such texture quantisation may be expressed as either with the knowledge that the two properties are inversely related.

A screening algorithm can be used to hide defects in media that the image is printed on. However, the quality of media, for example, how smooth or coarse the media is, can vary. So a screening algorithm that is set up for smooth media may not work as well on course media. But the algorithm for coarse media may remove some image content that could be printed on smooth media.

It can be seen then that there is a need for a selectable halftone screen in a print device, wherein the halftoning algorithm could be changed depending on the roughness of the media being used.

It can also be seen then that there is a need for a method and apparatus that uses pre-defined halftone screens for a range of media smoothness, wherein the pre-defined halftone screens may be stored and selected by the operator or automatically.

SUMMARY OF THE INVENTION

To overcome the limitations in the prior art described above, and to overcome other limitations that will become apparent upon reading and understanding the present specification, the present invention discloses a method and apparatus using media roughness as a print parameter.

The present invention solves the above-described problems by adjusting a print apparatus based upon media roughness to provide reliable output quality.

A method in accordance with the principles of the present invention includes ascertaining information regarding the smoothness of media and utilizing the information about the media smoothness in the generation of an output.

Other embodiments of a method in accordance with the principles of the invention may include alternative or optional additional aspects. One such aspect of the present invention is that the utilizing further comprises using a halftoning screen related to the information about the media smoothness.

Another aspect of the present invention is that the ascertaining further comprises identifying a smoothness level for the media.

Another aspect of the present invention is that the identifying further comprises manually providing the smoothness level to a print device.

Another aspect of the present invention is that the utilizing further comprises using a halftoning screen related to the information about the media smoothness.

Another aspect of the present invention is that the print device is a printer.

Another aspect of the present invention is that the print device is a digital copier.

Another aspect of the present invention is that the identifying further comprises projecting light on media to be printed on, gathering reflected light from the media, generating a signal indicating a smoothness level for the media and processing the signal indicating the smoothness level for the media to quantify the media smoothness.

Another aspect of the present invention is that the utilizing further comprises using a halftoning screen related to the information about the media smoothness.

In another embodiment of the present invention a print device is provided. The print device includes a worker system for rendering a page layout on a medium and a smoothness processing system, coupled to the worker system, the smoothness processing system ascertaining information regarding the smoothness of media and controlling the worker system in response to the ascertained information about the media smoothness.

Another aspect of the present invention is that the smoothness processing system comprises a user input interface for manually entering a media smoothness indicator.

Another aspect of the present invention is that the smoothness processing system further comprises a processor, the processor receiving the media smoothness indicator and selecting a halftoning screen according to the media smoothness indicator.

Another aspect of the present invention is that the selected halftoning screen controls the worker system to provide an optimal print quality for the page layout on the medium.

Another aspect of the present invention is that the smoothness processing system further includes a light source for projecting light onto a medium, a light converter for gathering light reflected off of the medium in proportion to the smoothness of the medium and in response generating a signal proportional to the smoothness of the medium and a processor, coupled to the light converter, for processing the signal proportional to the smoothness of the medium to generate a control signal and selecting a halftoning screen according to the media smoothness indicated by the control signal.

Another aspect of the present invention is that the light converter comprises a fresnel lens and a charge coupled device.

In another embodiment of the present invention an article of manufacture including a program storage medium readable by a computer is provided. The medium tangibly embodies one or more programs of instructions executable by the computer to perform a method for providing improved print quality regardless of media smoothness by ascertaining information regarding the smoothness of media and utilizing the information about the media smoothness in the generation of an output.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus using media roughness as a print parameter in print devices, such as printers and digital copiers. A selectable halftone screen is used in the print device. The halftoning algorithm can be changed depending on the texture of the media being used. Pre-defined halftone screens may be stored and selected for a range of media smoothness. The selection of the pre-defined halftones may be selected by the operator or may be selected automatically by the print device.

Figure 1:
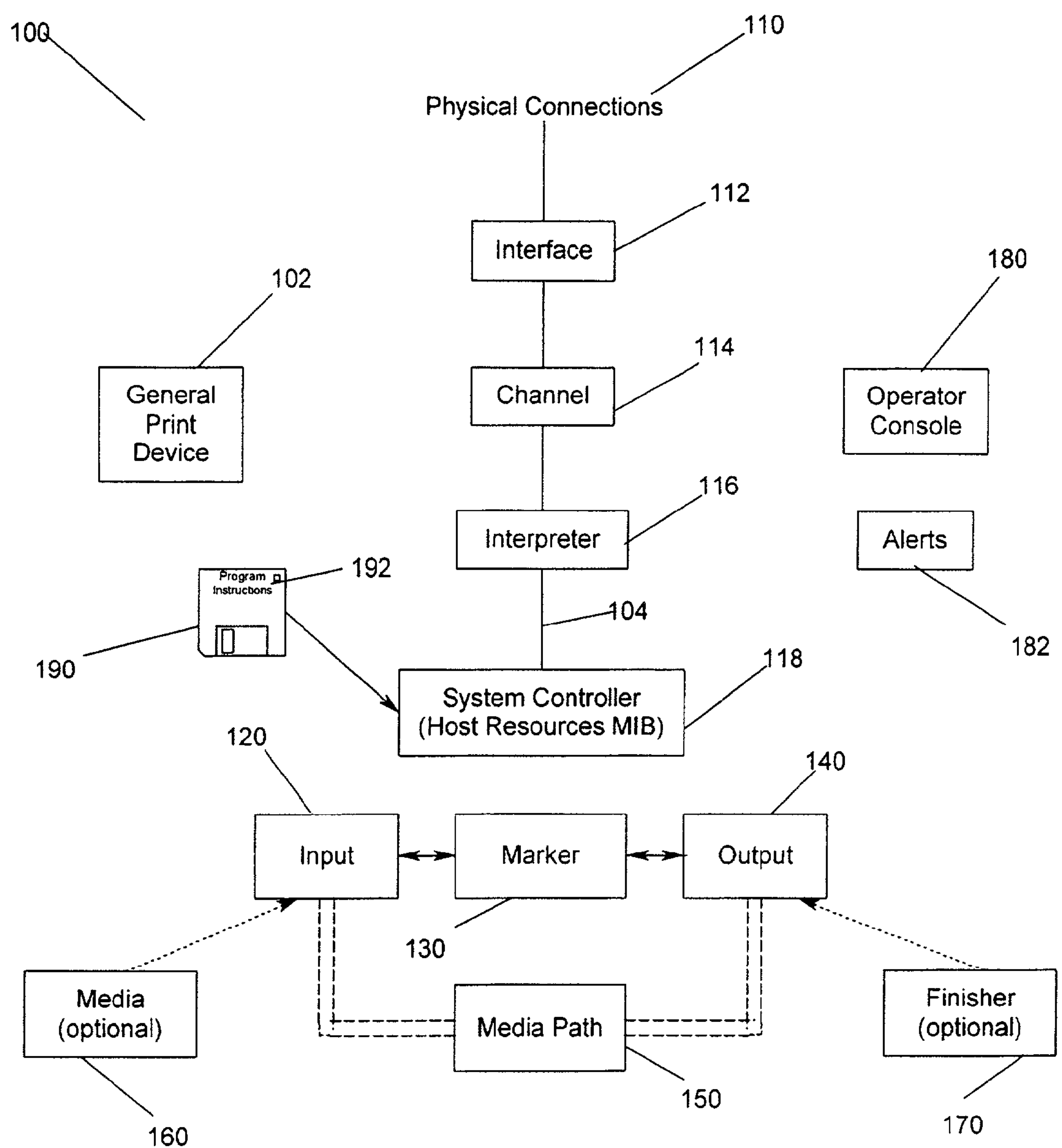
FIG. 1 illustrates a block diagram of a print device according to the present invention.

FIG. 1 illustrates a block diagram of a print device 100, such as printers and digital copiers, according to the present invention. Those skilled in the art will recognize that the sub-units of the print device illustrated in FIG. 1 may not necessarily relate directly to any physically identifiable mechanism. Sub-units can also be a set of definable logical processes, such as interpreters for page description languages or command processors that set various operating modes of the print device.

FIG. 1 illustrates the three basic functions of the print device: (1) the flow of a print file into an interpreter and onto the marker, (2) the flow of media through the marker and (3) the auxiliary sub-units that control and facilitate the two flows. As shown in FIG. 1, the flow of the print data comes through a physical connection 110 on which some form of transport protocol stack is running to a print device interface 112. The data provided by the transport protocol (interface) appears on a channel 114. The channel 114 provides the data stream to the input of an interpreter 116. The interpreter 116 is responsible for the conversion of a description of intended print instances into images that are to be marked on the media. A print device may have one or more interpreters.

As shown in FIG. 1, the media 160 initially resides in Input sub-units 120 from which the media 160 is selected and then transported via a Media Path 150 first to a Marker 130 and then onto an Output 140 with (optionally) some finishing operations 170 being performed. The Input 120 is a mechanism that feeds media to be marked on into the print device. There may be as many Inputs 120 as there are distinctly selectable input "addresses". The Media 160 is an extension of the Input 120 which represents that media that is in an Input 120. The Output 140 is a mechanism that receives media that has been marked on. A print device may contain one or more Output mechanisms 140. There are as many Outputs 140 as there are distinctly selectable output "addresses". A finisher 170 is a unit that performs some operations on the media other than marking. Some examples of finishing processes are stapling, punching, binding, inserting, or folding. The optional finisher 170 can be used to apply highlight color, an image or MICR (magnetic ink character recognition) ink or toner to the media. The finisher 170 would also use the roughness of the media to determine the correct halftoning screen to use with the media.

A Marker 130 is the mechanism that produces marks on the print media. A print device can contain one or more Markers 130. Some examples of multiple marker sub-units 130 are: a print device with separate markers for normal and magnetic ink or an image setter that can output to both a proofing device and final film. Each Marker 130 can have its own set of characteristics associated with it, such as marking technology and resolution. The media paths 150 encompass the mechanisms in the print device that move the media through the print device and connect all other media related units: Inputs 120, Outputs 140, Markers 130 and Finishers 170. A print device may contain one or more media paths 150. In general, the design of the media paths 150 determines the maximum speed of the print device as well as the maximum media size that the print device can handle. Media paths 150 are complex mechanisms and can contain many different identifiable sub-mechanisms such as media movement devices, media buffers, duplex units and interlocks. Not all of the various sub-mechanisms reside on every media path 150. For example, one media path may provide printing only on one surface of the media (a simplex path) and another media path may have a sub-mechanism that turns the media over and feeds it a second time through the marker sub-unit (a duplex path). The duplex path may even have a buffer sub-mechanism that multiple copies of the obverse side to be held before the reverse side of all the copies are marked.

The auxiliary sub-units, such as the General Print Device 102, Operator Console 180 and Alerts 182, facilitate control of the print device, inquiry/control of the operator panel, reporting of alerts, and the adaptation of the print device to various natural languages and characters sets. The General Print Device 102 is responsible for the overall control and status of the print device. The Operator Console 180 is used to display and modify the state of the print device. The console 180 can be as simple as a few indicators and switches or as complicated as full screen displays and keyboards. The Alert unit 182 is responsible for detecting reportable events, making an entry in the alert table and, if and only if, the event is a critical event, initiating a trap. For example, if the correct textured paper media is not loaded in the print device then this could be communicated back to the host through the bi-directional print data stream 104. In addition to this, an alert via the Alert unit 182 can be used to notify the manager of the printer that the correct textured paper media is not loaded in the printing device, or that the textured paper media has changed.

All of the above described functions run on the System Controller 118 which represents the processor, memory and storage systems of the print device. The System Controller 118 implements the control functions for processing a print job. The System Controller 118 includes the Management Information Base (MIB), which provides access to data elements of the print device, such as the processor(s), memory, disk storage, file system and other underlying sub-mechanisms of the print device. The System Controller 118 can range from simple single processor systems to multiprocessor systems. In addition, controllers can have a full range of resources such as hard disks. Those skilled in the art will recognize that a print device may have more than one processor and multiple other resources associated with it.

A process for using information regarding the roughness of the media (such as paper) as a print parameter to provide reliable output quality is performed by the System Controller 118. The process, as will be described below with reference to FIGS. 2–3, may be tangibly embodied in a computer-readable medium or carrier, e.g. one or more of the fixed and/or removable data storage devices 190, or other data storage or data communications devices. The computer program 192 of the storage device 190 may be loaded into System Controller 118 to configure the System Controller 118 for execution. The computer program 192 comprise instructions which, when read and executed by the System Controller 118 causes the System Controller 118 to perform the steps necessary to execute the steps or elements of the present invention.

Figure 2:
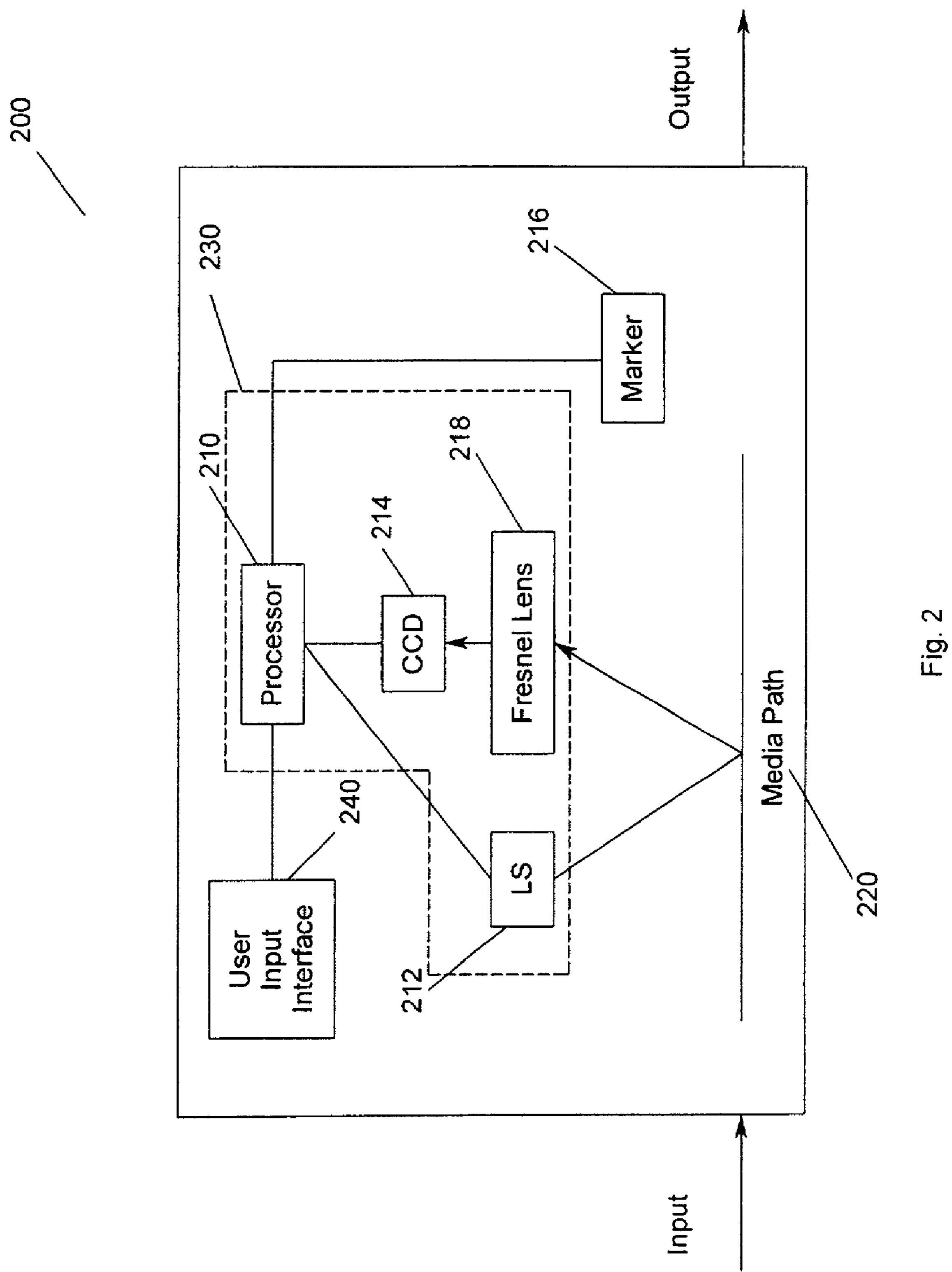
FIG. 2 illustrates a block diagram of a print device having a media roughness detector system according to the present invention.

FIG. 2 illustrates a block diagram of a print device 200 having a media roughness detector system according to the present invention. In FIG. 2, the print device 200 includes a controller/processor 210. The processor 210 controls the light source (LS) 212, a device for converting light into proportional (analog) electrical current such as a charged coupled device (CCD) 214 and the marker 216 or other hardware for rendering an electronic image onto some type of output media such as paper. The CCD 214 above the media path 220 measures the light from the light source that is reflected by the media. Smooth media reflects more light and therefore the CCD 214 generates a signal that is proportional to the amount of reflected light. Rough media will reflect less light. The sensitivity of the CCD 214 provides for an output signal that represents a wide spectrum of media smoothness.

A fresnel lens 218 is used to gather together the rays of light coming from a source and direct them into a narrow beam. Thus, the fresnel lens 218 inserted in front of the CCD prevents dispersed light from being measured. Since rough media disperses the light at many different angles, the amount of light received back in nearly parallel rays is an indication of its smoothness. Off white or colored media could be compensated by a form description entered by the operator describing its color. In fact on a print device display which is a color display, examples of different shades of colored media could be displayed. Then the operator just matches the closest shade to their actual media and selects that as the colored form. Again the smoothness may be automatically measured.

The smoothness processing system 230, which may be formed, for example, by processor 210, light source 212, CCD 214 and fresnel lens 218, is just one way of determining the roughness of the media. Alternatively, a user of the print device 200 may select the quality of the media needed for his application manually using a user input interface 240. Using the user input interface 240, the user may simply select a media smoothness for media being used by the print device. If only the manual method is used, obviously the LS 212, CCD 214 and fresnel lens 218 are not needed. Both manual and automatic media roughness selection provide the benefits of the best possible screening algorithm to match the particular media chosen. Those skilled in the art will recognize that the automation of measuring smoothness of the media does not have to be implemented for the basic idea of utilizing the media roughness information to generate better output such as by selecting the screening algorithm to work best with the given media roughness. The media roughness print parameter can also be entered remotely and then be stored with a particular job. The parameter can then come down the print stream to processor 210 of the print device 200 in a job ticket. Accordingly, the parameter in the job ticket may indicate to the processor 210 that the current print job is for an important customer that requires the smoothest paper, or the parameter may indicate to the processor 210 that rough paper is to be used, for example, for greeting cards or stationary.

The processor 210, through data supplied by the user via the user input interface or via an electrical signal from the CCD representing the roughness of the media, selects an optimum halftone screen for the level of media roughness.

Media roughness values may be included in the forms definitions to make possible quick selection of the optimal halftone screens by the processor 210. Accordingly, better print quality is provided using less expensive media. Moreover, marketing departments are better able to justify the print device costs based on the savings in media costs for the desired quality.

Figure 3:
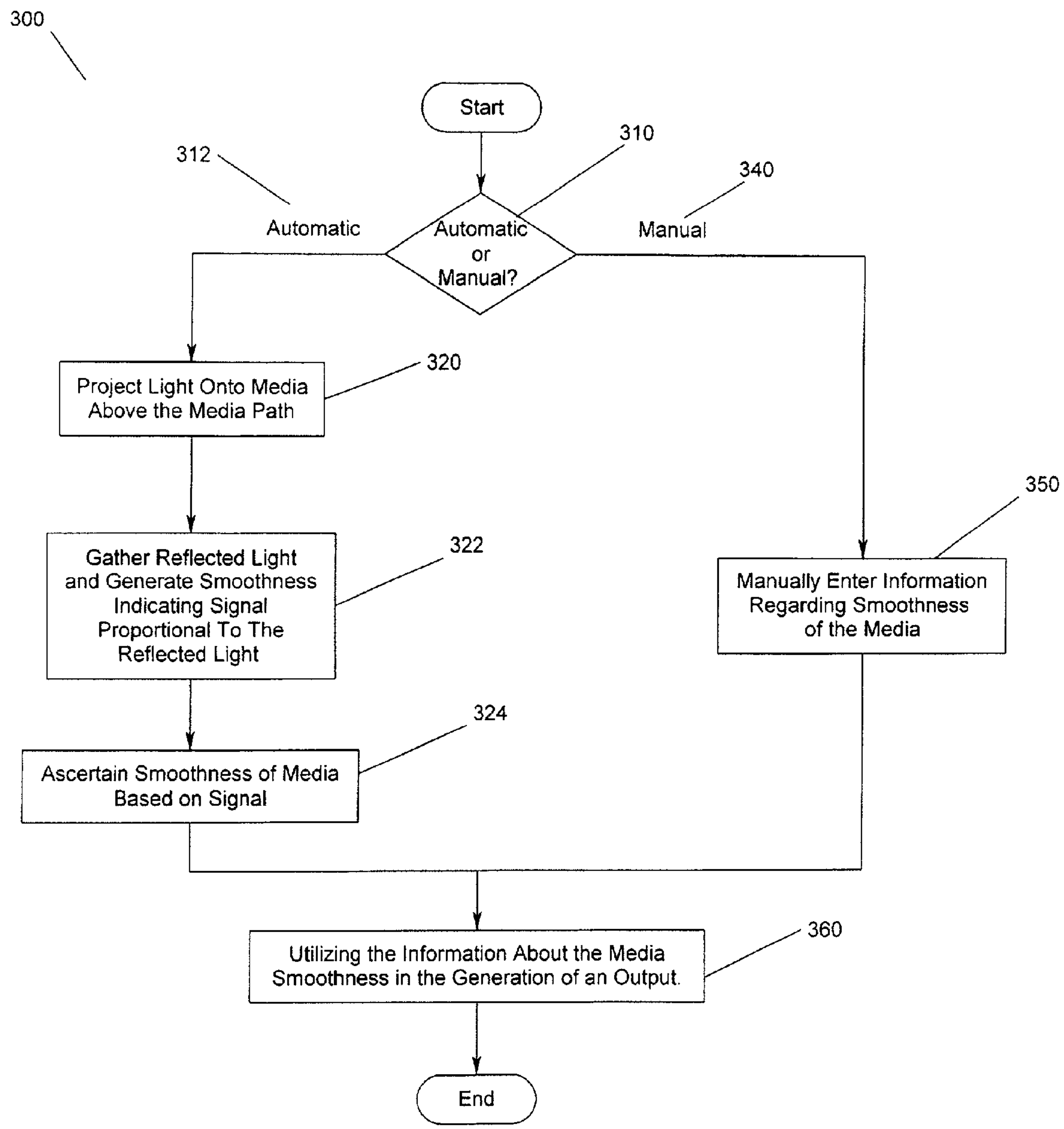
FIG. 3 illustrates a flow chart for a method using media roughness as a print device parameter to improve print quality according to the present invention.

FIG. 3 illustrates a flow chart 300 for a method using media roughness as a print device parameter to improve print quality according to the present invention. In FIG. 3, the ascertaining of the media texture may be automatic or manual 310. If the process is automatic 312, light is reflected on the media above the media path 320. Then, the reflected light is gathered and a smoothness indicating signal proportional to the amount of reflected light is generated 322. Then the smoothness of the media is ascertained based on the smoothness indicating signal 324. This information about the media smoothness is used in the generation of an output 360. For example, halftone screens in the print device are selected based upon the smoothness indicating signal. Thus, the halftoning algorithm used to provide the control signals to the print elements can be changed depending on the roughness of the media being used.

If the process is manual 340, the user manually enters information regarding the smoothness of the media, for example, via a user input interface. Pre-defined halftone screens for a range of media smoothness may be stored and selected by the operator. The information about eh media smoothness that is manually provided by the user is then used in the generation of an output 360. The automatic smoothness path 312 or the manual entry path 340 can be used to confirm the user's requested media quality, i.e., smoothness or roughness, is in fact available for output.

The foregoing description of the exemplary embodiment of the invention has been presented for the purposes of illustrating and description. It is not intended to be exhaustive or to limit the invention to the precise form disclosed. Many modifications and variations are possible in light of the above teaching. It is intended that the scope of the invention be limited not with the detailed description, but rather by the claims appended hereto.

The invention claimed is:

1. A method for providing improved print quality regardless of media smoothness, comprising:

ascertaining information regarding the smoothness of media; and utilizing the information about the media smoothness in the generation of an output, wherein utilizing includes using a halftoning screen related to the information about the media smoothness.

2. The method of claim 1 wherein the ascertaining further comprises identifying a smoothness level for the media.

3. The method of claim 2 wherein the identifying further comprises manually providing the smoothness level to a print device.

4. The method of claim 3 wherein the print device is a printer.

5. The method of claim 3 wherein the print device is a digital copier.

6. The method of claim 2 wherein the identifying further comprises projecting light on media to be printed on, gathering reflected light from the media, generating a signal indicating a smoothness level for the media and processing the signal indicating the smoothness level for the media to quantify the media smoothness.

7. The method of claim 1 wherein the ascertaining further comprises storing information with a print job, wherein the information comprises a smoothness parameter associated with the print job.

8. The method of claim 1 further comprising communicating to a host when media having a smoothness required according to the information is not available in the print device.

9. The method of claim 8 further comprising issuing an alert indicating that media having smoothness required according to the information is unavailable.

10. A print device, comprising:

a marker system for rendering a page layout on a medium;

a smoothness processing system, coupled to the marker system, the smoothness processing system ascertaining information regarding the smoothness of media and controlling the marker system in response to the ascertained information about the media smoothness, the smoothness processing system comprising:

a user input interface for manually entering a media smoothness indicator and a processor, the processor receiving the media smoothness indicator and selecting a halftoning screen according to the media smoothness indicator.

11. The print device of claim 10, wherein the selected halftoning screen controls the marker system to provide an optimal print quality for the page layout on the medium.

12. The print device of claim 10 wherein the smoothness processing system further comprises: a light source for projecting light onto a medium; a light converter for gathering light reflected off of the medium in proportion to the smoothness of the medium and in response generating a signal proportional to the smoothness of the medium; and a processor, coupled to the light converter, for processing the signal proportional to the smoothness of the medium to generate a control signal and selecting a halftoning screen according to the media smoothness indicated by the control signal.

13. The print device of claim 12 wherein the light converter comprises a fresnel lens and a charge coupled device.

14. The print device of claim 10 wherein the marker further includes a finisher, the finisher using the information regarding the smoothness of media to apply an appropriate halftoning screen for use with the media having the indicated smoothness.

15. The print device of claim 10 wherein the smoothness processing system receives information regarding the smoothness of the media that is associated with and stored with a print job.

16. The print device of claim 10 further comprising a bi-directional print stream, the print device communicating to a host through the bi-directional print stream when media having a smoothness required according to the information is not available in the print device.

17. The print device of claim 10 further comprising issuing an alert for indicating that media having smoothness required according to the information is unavailable.

18. An article of manufacture comprising a program storage medium readable by a computer, the medium tangibly embodying one or more programs of instructions executable by the computer to perform a method for providing improved print quality regardless of media smoothness, the method comprising: ascertaining information regarding the smoothness of media; and utilizing the information about the media smoothness in the generation of an output, wherein utilizing the information includes using a halftoning screen related to the information about the media smoothness.

19. The article of manufacture of claim 18 wherein the ascertaining further comprises identifying a smoothness level for the media.

20. The article of manufacture of claim 19 wherein the identifying further comprises manually providing the smoothness level to a print device.

21. The article of manufacture of claim 19 wherein the identifying further comprises projecting light on media to be printed on, gathering reflected light from the media, generating a signal indicating a smoothness level for the media and processing the signal indicating the smoothness level for the media to quantify the media smoothness.

22. The article of manufacture of claim 18 wherein the ascertaining further comprises storing information with a print job, wherein the information comprises a smoothness parameter associated with the print job.

23. The article of manufacture of claim 18 further comprising communicating to a host when media having a smoothness required according to the information is not available in the print device.

24. The article of manufacture of claim 23 further comprising issuing an alert indicating that media having smoothness required according to the information is unavailable.

* * * * *

UNITED STATES PATENT AND TRADEMARK OFFICE

CERTIFICATE OF CORRECTION

PATENT NO. : 7,085,014 B2
APPLICATION NO. : 09/876507
DATED : August 1, 2006
INVENTOR(S) : Condon et al.

It is certified that error appears in the above-identified patent and that said Letters Patent is hereby corrected as shown below:

Col. 2, line 9: “quantisation” should read -- quantization --
Col. 7, line 28: “eh” should read -- the --
Col. 7, line 36: “illustrating” should read -- illustration --
Col. 7, line 40: “the” should read -- this --
Col. 8, line 21: “indicator and” should read -- indicator; and --

Signed and Sealed this

Seventeenth Day of October, 2006

JON W. DUDAS
*Director of the United States Patent and Trademark Office*